US009471798B2

(12) United States Patent
Vepa et al.

(10) Patent No.: US 9,471,798 B2
(45) Date of Patent: Oct. 18, 2016

(54) AUTHORIZATION POLICY OBJECTS SHARABLE ACROSS APPLICATIONS, PERSISTENCE MODEL, AND APPLICATION-LEVEL DECISION-COMBINING ALGORITHM

(71) Applicant: Oracle International Corporation, Redwood Shores, CA (US)

(72) Inventors: Sirish V. Vepa, Bangalore (IN); Hari Sastry, San Jose, CA (US); Alan Cao, Beijing (CN); Cynthia Ding, Beijing (CN)

(73) Assignee: Oracle International Corporation, Redwood Shores, CA (US)

( * ) Notice: Subject to any disclaimer, the term of this patent is extended or adjusted under 35 U.S.C. 154(b) by 35 days.

(21) Appl. No.: 14/484,050

(22) Filed: Sep. 11, 2014

(65) Prior Publication Data

US 2015/0089575 A1 Mar. 26, 2015

Related U.S. Application Data

(60) Provisional application No. 61/880,745, filed on Sep. 20, 2013.

(51) Int. Cl.
| | | |
|---|---|---|
| *G06F 21/62* | (2013.01) | |
| *H04L 29/06* | (2006.01) | |
| *H04L 12/24* | (2006.01) | |
| *G06F 21/60* | (2013.01) | |

(52) U.S. Cl.
CPC ............. *G06F 21/62* (2013.01); *G06F 21/604* (2013.01); *G06F 21/6281* (2013.01); *H04L 41/0893* (2013.01); *H04L 63/20* (2013.01)

(58) Field of Classification Search
CPC .. G06F 21/6281; G06F 21/604; G06F 21/62; H04L 63/10; H04L 63/20; H04L 41/0893
See application file for complete search history.

(56) References Cited

U.S. PATENT DOCUMENTS

| | | | | |
|---|---|---|---|---|
| 6,158,010 A | * | 12/2000 | Moriconi | G06F 21/552 709/223 |
| 7,673,323 B1 | * | 3/2010 | Moriconi | G02B 6/132 726/1 |
| 2002/0059471 A1 | * | 5/2002 | Sanghvi | G06F 9/542 719/318 |
| 2002/0188568 A1 | * | 12/2002 | Nickolaisen | G06F 21/31 705/52 |
| 2003/0115322 A1 | * | 6/2003 | Moriconi | G02B 6/132 709/224 |
| 2012/0036370 A1 | * | 2/2012 | Lim | H04L 9/0822 713/189 |
| 2012/0131164 A1 | * | 5/2012 | Bryan | G06F 21/604 709/223 |
| 2012/0260303 A1 | * | 10/2012 | Wollnik | G06F 21/6218 726/1 |
| 2014/0032691 A1 | * | 1/2014 | Barton | H01L 41/00 709/206 |

\* cited by examiner

*Primary Examiner* — Kaveh Abrishamkar
*Assistant Examiner* — Thomas Ho
(74) *Attorney, Agent, or Firm* — Kilpatrick Townsend & Stockton LLP

(57) ABSTRACT

A global policy store, in which policies applicable to multiple applications in an enterprise environment can be stored, can be stored in association with that environment. An application-level policy combining algorithm can be associated with a specific application to resolve conflicts between the results of evaluating policies that pertain to that application's resources. A persistent model is defined for an Extensible Access Control Markup Language (XACML) target definition.

17 Claims, 11 Drawing Sheets

AUTHORIZATION POLICY OBJECTS SHARABLE ACROSS APPLICATIONS, PERSISTENCE MODEL, AND APPLICATION-LEVEL DECISION-COMBINING ALGORITHM

CROSS-REFERENCES TO RELATED APPLICATIONS

This application claims priority to U.S. Provisional Patent Application No. 61/880,745 filed on Sep. 20, 2013 titled "AUTHORIZATION POLICY OBJECTS SHARABLE ACROSS APPLICATIONS, SIMPLIFIED TARGET DEFINITION, AND APPLICATION-LEVEL DECISION-COMBINING ALGORITHM," which is herein incorporated by reference in its entirety for all purposes.

BACKGROUND

In many cases, an enterprise has some common security policies to enforce in all applications. If the polices are defined in each application scope, the policy will be redundant and hard to maintain.

In the field of computer security, general access control includes authorization, authentication, access approval, and audit. Access control involves access approval, whereby a computing system makes a decision to grant or reject an access request from an already authenticated subject, based on what the subject is authorized to access. Authentication and access control are often combined into a single operation, so that access is approved based on successful authentication, or based on an anonymous access token. Authentication methods and tokens may include passwords, biometric scans, physical keys, electronic keys and devices, hidden paths, social barriers, and monitoring by humans and automated systems.

In an access control model, the entities that can perform actions in the system are usually called subjects, and the entities representing resources to which access may need to be controlled are usually called objects. Subjects and objects may be software entities rather than human users. In some models, such as the object-capability model, a software entity can potentially act as both a subject and object. Objects can include computing system resources (referred to herein briefly as "resources") such as executable application programs (referred to herein briefly as "applications"), file system structures such as files and directories, communication ports, volatile memory segments, etc.

Access control models used by current systems can be based upon capabilities or upon access control lists (ACLs). In a capability-based model, holding an unforgettable reference or capability to an object provides access to the object (roughly analogous to how possession of a house key grants one access to his house); access is conveyed to another party by transmitting such a capability over a secure channel. In an ACL-based model, a subject's access to an object can depend on whether its identity is on a list associated with the object (roughly analogous to how a bouncer at a private party would check one's ID to see whether his name is was the guest list); access can be conveyed by editing the list. Both capability-based and ACL-based models can include mechanisms to allow access rights to be granted to all members of a group of subjects. Such a group itself can be modeled as a subject.

Access control systems can provide the services of authorization, identification and authentication, access approval, and accountability. Authorization involves specifying the actions that a subject is permitted to perform. Identification and authentication prevents illegitimate subjects from accessing a system. Access approval involves granting access during operations, by associating users with the resources that they are allowed to access based on an authorization policy. Accountability identifies the actions that a subject performed.

Authorization can involve defining access rights for subjects. An authorization policy can specify the operations that subjects are allowed to perform within a system. Some operating systems implement authorization policies as formal sets of permissions that are variations or extensions of three basic types of access. With read access, a subject can read file contents and list directory contents. With write access, a subject can change the contents of a file or directory by adding data to an existing file structure, creating a new file structure, deleting an existing file structure, or renaming an existing file structure. With execute access, a subject can cause the system to execute (run) a program. These rights and permissions can be implemented differently in systems having different access control models. Access control models are sometimes categorized as being either discretionary or non-discretionary. Some widely recognized models include discretionary access control (DAC), mandatory access control (MAC), role-based access control (RBAC), and attribute-based access control (ABAC).

In attribute-based access control (ABAC), access is granted not necessarily based on the rights of the subject associated with a user after authentication, but based on attributes of the user himself. The user can be asked to satisfy, to an access control engine, claims about his attributes. An attribute-based access control policy specifies which claims need to be satisfied in order to grant access to an object. For example, the claim could be "older than 18." Under such circumstances, a user that could prove this claim would be granted access. Under this model, users can be anonymous because authentication and identification are not strictly required. Means for proving claims anonymously can be achieved using anonymous credentials. Extensible Access Control Markup Language (XACML) is a standard for attribute-based access control.

Discretionary access control (DAC) involves a policy determined by the owner of an object. The owner decides which users are allowed to access the object and what privileges those users have with respect to the object. In a DAC-based system, each object in the system can have an owner. In some DAC-based systems, each object's initial owner can be the subject that caused that object to be created. The access policy for an object can be determined by that object's owner. In a DAC-based system, an owner can assign access rights and permissions for specific resources such as to other subjects.

Mandatory access control (MAC) involves allowing a user to access a resource if rules exist that allow that user to access that resource. Management of a MAC-based system can be simplified when the objects are protected using hierarchical access control, and/or through the implementation of sensitivity labels. In a system using sensitivity labels, a separate sensitivity label can be assigned to each subject and object. A subject's sensitivity label can specifies its level of trust. An object's sensitivity label can specify the level of trust required to access that object. A subject is permitted to access an object if the subject's sensitivity level is equal to or greater than the level of trust required by the object. MAC-based system can use rule-based access control. Rule-based control can involve determining whether a subject should be granted or denied access to an object by comparing the object's sensitivity label to the subject's sensitivity label.

Role-based access control (RBAC) can involve an access policy determined by a system in which an object exists. RBAC systems can be non-discretionary, in that access can be controlled at the system level (by a system administrator instead of by an object's owner. RBAC systems can control collections of permissions. A role in an RBAC system can be viewed as a set of permissions. In an RBAC system, a subject can access a resource if the subject has been assigned a role that is permitted to access that resource. Roles can be combined in a hierarchy in which higher-level roles subsume permissions owned by sub-roles.

Challenges may arise in an enterprise that involves heterogeneous authorization (or access control) environments. Such heterogeneous authorization environments may employ disparate access control models. An enterprise might, for example, involve some components that employ Oracle Platform Security Service (OPSS) as an authorization environment and other components that employ Oracle Access Manager (OAM) as an authorization environment. The access controls provided by OPSS can be application-specific; such access controls can be implemented within applications by the designers of those applications, often with a deployment in a specific type of enterprise—often one that is expected to use the RBAC model enterprise-wide—in mind. Thus, the OPSS access controls that application designers incorporate into their applications can be role-based. In contrast, the access controls provided by OAM can be enterprise-wide (generally applicable rather than specific to any particular application), and specified at application deployment time rather than at application design time. The access controls provided by OAM can be based on a DAC-based model that permits policy administration to be delegated. Implementing both types of systems in a separate and segregated manner can be wasteful of system resources and duplicative of efforts.

BRIEF SUMMARY

In order to avoid wasteful duplication, some embodiments involve a global container that contains policies that are applicable to multiple separate applications in the environment. Artifacts, including but not limited to authorization policies, which are common to multiple applications in the environment, are stored in the global container. In this manner, the artifacts stored in the global container can be defined just once but still used by many applications.

According to some embodiments, application administrators for different applications can specify application-level policies that are specific to the applications that they administer. These application-level policies are used to resolve conflicts between results of evaluations of top policies and top policy sets relative to specific applications' resources. The application-level policy specified for one application can differ from the application-level policy specified for another application.

In some embodiments, a persistent model for an XACML target definition can be defined.

DETAILED DESCRIPTION

Figure 1:
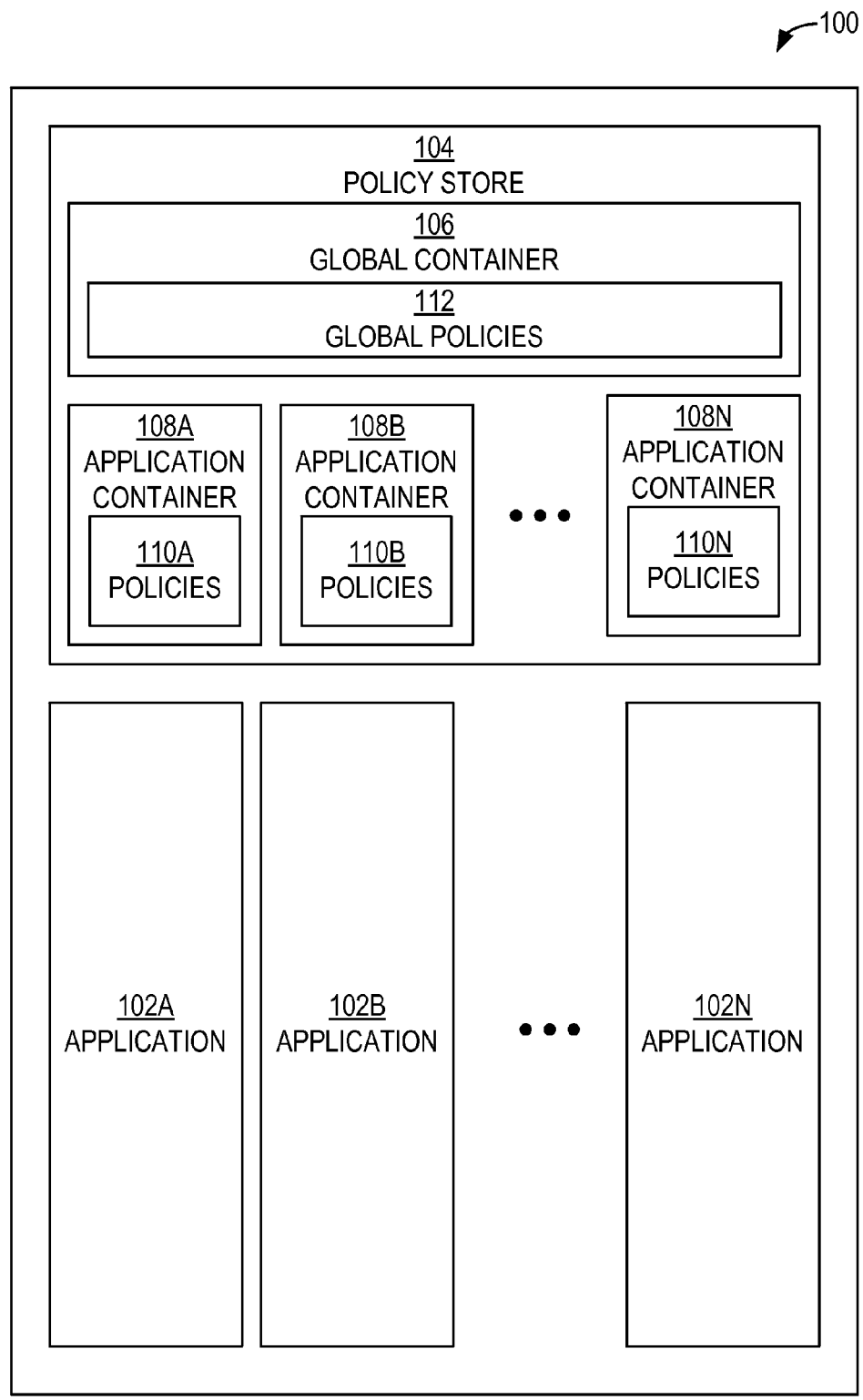
FIG. 1 is a diagram that illustrates an example of an environment that includes multiple applications and a policy store that has both a global container and multiple application-specific containers, according to some embodiments.

Disclosed herein are techniques for establishing a global policy store in which policies applicable to multiple applications in an enterprise environment can be stored. Also disclosed herein are techniques for associating an application-level policy combining algorithm with a specific application. Also disclosed herein is a persistent model for an XACML target definition.

Authorization Policy Objects Sharable Across Applications

An enterprise environment can include multiple various applications. These applications can have different functions, can be used by different groups of users, and can be administered by different administrators. However, often these applications will end up needing at least some of the same objects, or artifacts. Such artifacts can include authorization policies that are applicable to the users of the applications, for example.

Such authorization policies indicate who is allowed to access what. Even though artifacts such as authorization policies often are needed by multiple applications, some approaches have involved the duplication of such artifacts for each separate application that uses such artifacts. This duplication is wasteful of storage resources and time.

In order to avoid such wasteful duplication, some embodiments involve a global container that contains policies that are applicable to multiple separate applications in the environment. Artifacts, including but not limited to authorization policies, which are common to multiple applications in the environment are stored in the global container. In this manner, the artifacts stored in the global container can be defined just once but still used by many applications.

Various different kinds of artifacts can be stored in the global container. Policies contained in the global container are applicable to all applications in the environment. Other kinds of artifacts can represent resource types, resources, application roles, rules, and entitlements. Application policies can be constructed based on resource types, resources, rules, and entitlements.

Each application in the environment has its own resources that are possessed only by that application. Each application's resources can be protected by application policies, which restrict access to those resources. Application policies specify the conditions that are to be satisfied before access to any of the application's resources is granted to a user.

For example, an enterprise environment might include a banking application, among other applications. Artifacts applicable to the banking application might include a resource type called bank account. Different users of the banking application can be associated with separate resources that possess this resource type; these users each have their own separate bank accounts. Artifacts applicable to the banking application also might include a role called customer. Users having accounts with the banking application possess this role. A policy associated with the banking application can indicate that a particular customer is to be granted access to that particular customer's own bank account during specified times of day and specified days of the week. In this case, the policy protects the bank account resource.

For another example, an enterprise environment might include separate applications such as a banking consumer application, a banking loan application, and a premier banking application. Each of these applications can have its own policy artifacts that protect that application's resources. An application's policies might be relevant only that that application and not to other applications in the same environment.

However, there can be some policies that are applicable to all applications in the environment. For example, a particular policy might be applicable to each of the banking consumer application, the banking loan application, and the premier banking application. Policies that are applicable to all applications in the environment are called global-level policies. These global-level polices can be distinguished from the application-level policies that are applicable only to individual applications. Global-level policies are enforced across all of the applications in an environment.

In some embodiments, policies become global-level policies by virtue of an administrator of some application in the environment placing those policies into the global container. Thus, in some embodiment, at least some of the global-level policies are products of the administrators of the individual applications.

In some embodiments, when an application is going to be deployed into the environment, that application is placed into a package for deployment. An application developer can attach a policy file to that application's package prior to deployment. When the application is deployed into the environment, the deployment mechanism (an application deployment bootstrap process) obtains the policy file that is attached to the application's package and places the policies described in the file into a policy store in the environment.

The policy store includes application-specific containers and a global container. The policy file can include a global policy section, which specifies global-level policies, and an application policy section, which specifies application-level policies. The deployment mechanism places the policies found in the global policy section of the file into the global container of the policy store. The deployment mechanism places the polices found in the application policy section of the file into the application-specific container that pertains specifically to that application (and not to other applications).

As is discussed above, each application in the environment can be associated with a separate application administrator. The environment provides a console through which an application administrator can view policies in, modify policies in, add policies to, and delete policies from the application container (in the policy store) that is associated with the application administrator. The console does not permit an application administrator to view policies in, modify policies in, add policies to, or delete policies from other application containers in the policy store.

In some embodiments, the console further permits multiple application administrators for different applications to view policies in, modify policies in, add policies to, and delete policies from the global container in the policy store. When an application administrator adds a policy to the global container, that policy automatically becomes a global-level policy by virtue of its presence within the global container. In some embodiments, a super-administrator for the environment grants, to individual application administrators, privileges (entitlements) that enable the application administrators to perform these one or more of these operations relative to the global container and the policies contained therein. Entitlements can be fine-grained to permit the performance just a limited subset of the possible operations relative to specific policies.

FIG. 1 is a diagram that illustrates an example of an environment 100 that includes multiple applications and a policy store that has both a global container and multiple application-specific containers, according to some embodiments. Environment 100 includes applications 102A-N and policy store 104. Policy store 104 includes a global container 106 and application containers 108A-N. Application containers 108A-N are specifically associated, one-to-one, with applications 102A-N, respectively, such that each application container is associated with just one application. Global container 106 is associated with all of applications 108A-N and environment 100 as a whole.

Applications containers 108A-N contain polices 110A-N, respectively. Policies 110A apply specifically to application 102A and to no other application, while policies 110B apply specifically to application 102B and to no other application, and so forth, to policies 110N, which apply to application 110N and to no other application. Global container 106 containers global policies 112. Global policies 112 apply to each and every one of applications 102A-N.

According to some embodiments, an administrator of application 102A is the only application administrator that is permitted to view policies in, modify policies in, add policies to, and delete policies from application container 108A. Similarly, an administrator of application 102B is the only application administrator that is permitted to view policies in, modify policies in, add policies to, and delete policies from application container 108B. However, both the administrator of application 102A and the administrator of application 102B are permitted to view policies in, modify policies in, add policies to, and delete policies from global container 106.

Figure 2:
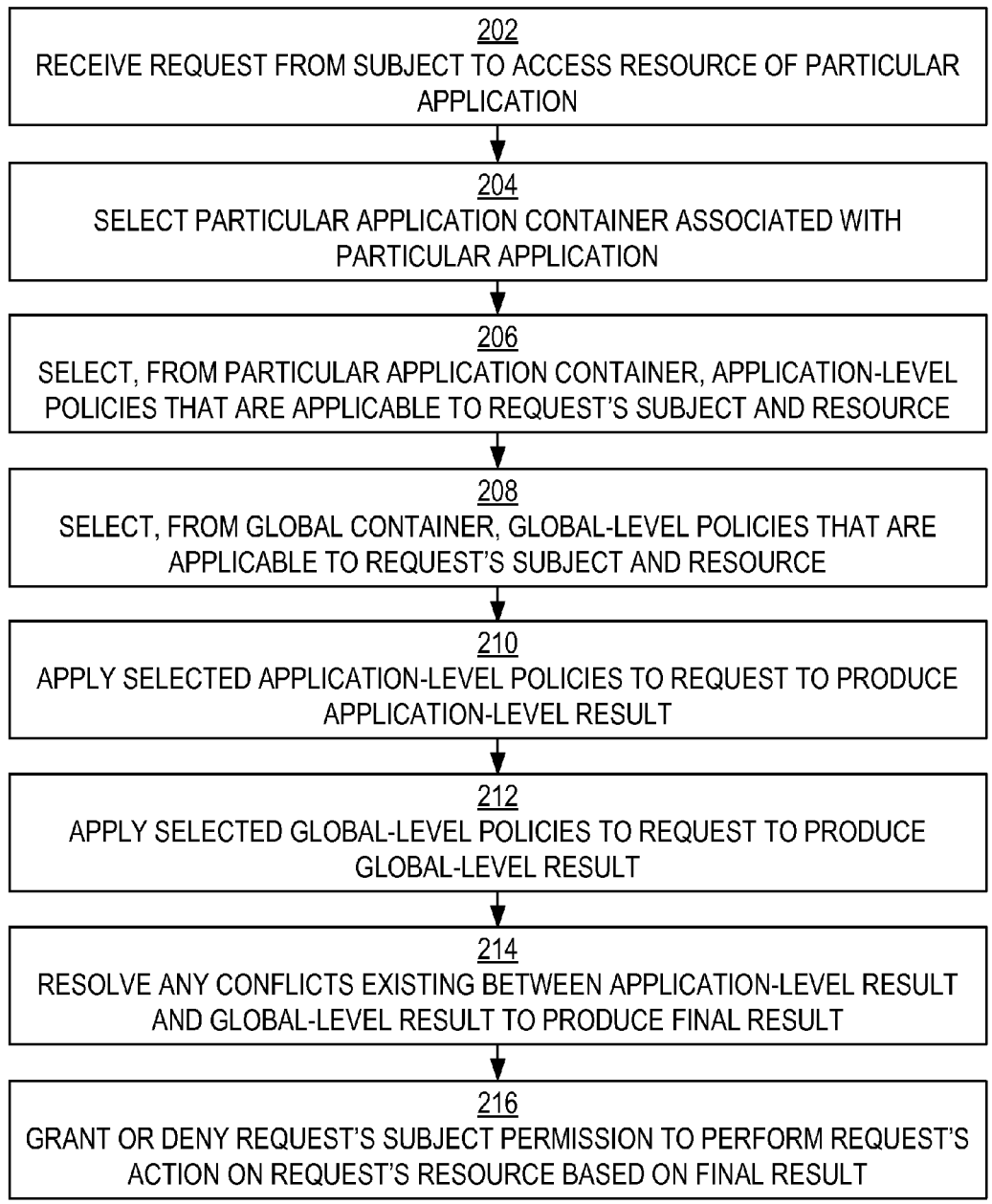
FIG. 2 is a flow diagram that illustrates an example of an technique for evaluating, based on both global policies and application-specific policies, whether a subject is permitted to access an application's resource, according to some embodiments.

FIG. 2 is a flow diagram that illustrates an example of an technique for evaluating, based on both global policies and application-specific policies, whether a subject is permitted to access an application's resource, according to some embodiments.

In block 202, an authorization engine receives a request from a subject to access a resource of a particular application.

In block 204, the authorization engine selects, from among multiple application-specific containers within a policy store, a particular application-specific container that is associated with the particular application.

In block 206, the authorization engine selects, from among policies contained in the particular application-specific container, one or more application-level policies that are applicable to the subject and the resource specified in the request. These application-level policies can have been added to the particular application-specific container by an application administrator for the particular application.

In block 208, the authorization engine selects, from among policies contained in a global container, one or more global-level policies that are applicable to the subject and the resource specified in the request. These global-level policies can have been added to the global container by application administrators for any application in the environment, including application administrators for applications other than the particular application.

In block 210, the authorization engine applies the one or more selected application-level policies to the request to determine whether the subject specified in the request should be granted or denied permission to perform an action specified in the request relative to the resource specified in the request. This policy evaluation produces an application-level result.

In block 212, the authorization engine applies the one or more selected global-level policies to the request to determine whether the subject specified in the request should be granted or denied permission to perform the action specified in the request relative to the resource specified in the request. This policy evaluation produces an global-level result.

In block 214, the authorization engine resolves any conflicts that might exist between the application-level result and the global-level result. Such resolution can be performed based on a policy-combining algorithm as discussed in greater detail below. The resolution produces a final result that is either to grant or deny the subject permission to perform the action relative to the resource.

In block 216, the authorization engine grants or denies the subject permission to perform the action relative to the resource in accordance with the final result produced by the resolution.

Figure 11:
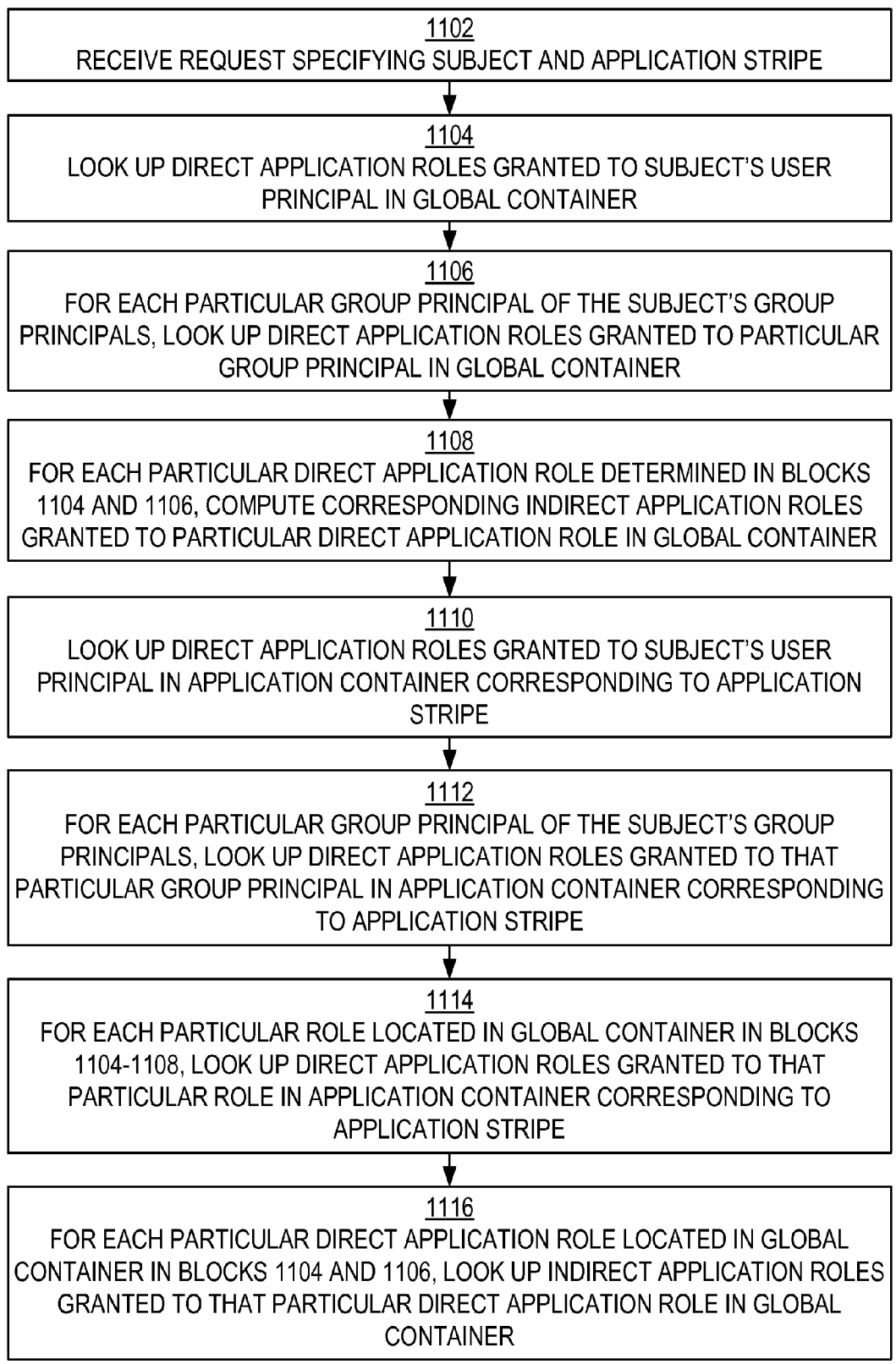
FIG. 11 is a flow diagram that illustrates an example of a technique for computing application roles from a global container in addition to application roles granted in a specific application stripe to which access is requested, according to some embodiments.

FIG. 11 is a flow diagram that illustrates an example of a technique for computing application roles from a global container in addition to application roles granted in a specific application stripe to which access is requested, according to some embodiments.

Blocks 1102-1108 generally describe how global application roles can be computed for a user. In block 1102, an authorization engine receives a request. The request can specify a subject and an application stripe to which access is requested. The subject can include a user principal. The subject also can include group principals.

In block 1104, the authorization engine looks up direct application roles granted to the subject's user principal in a global container.

In block 1106, for each particular group principal of the subject's group principals, the authorization engine looks up direct application roles granted to that particular group principal in the global container.

In block 1108, for each particular direct application role determined in blocks 1104 and 1106, the authorization engine computes corresponding indirect application roles granted to that particular direct application role in the global container.

Blocks 1110-1116 generally describe how application roles in an application stripe being accessed can be computed. In block 1110, the authorization engine looks up direct application roles granted to the subject's user principal in the application container corresponding to the application stripe.

In block 1112, for each particular group principal of the subject's group principals, the authorization engine looks up direct application roles granted to that particular group principal in the application container corresponding to the application stripe.

In block 1114, for each particular role—direct or indirect—previously located in the global container in blocks 1104-1108, the authorization engine looks up direct application roles granted to that particular role in the application container corresponding to the application stripe.

In block 1116, for each particular direct application role previously located in the global container in blocks 1104-1106, the authorization engine looks up indirect application roles granted to that particular role in the global container.

Policy-Combining Algorithms

In some cases, the evaluation of a global-level policy to determine whether access to a particular resource is to be granted or denied can produce a result that conflicts with the result produced by the evaluation of an application-level policy to determine whether access to that particular resource is to be granted or denied. Under such circumstances, a policy-combining algorithm can be used to resolve the conflict.

Evaluation of the policy-combining algorithm can be used to determine which of several policies producing conflicting results should take effect. The policy-combining algorithm can select between multiple polices and/or multiple sets of policies. For example, the policy-combining algorithm can specify "grant override." In that case, any applicable policy that grants access to a particular resource when evaluated will take effect even if other applicable policies deny access to that particular resource when evaluated. For another example, the policy-combining algorithm can specify "deny override." In that case, any applicable policy that denies access to a particular resource when evaluated will take effect even if other applicable policies grant access to that particular resource when evaluated.

Other possible policy-combining algorithms can include "first applicable," which accepts, as the final and definitive result of policy evaluation, the result that is produced by the first-found policy that is applicable to the subject and resource specified in a request. After such a result is produced, an authorization engine does not need to evaluate other policies that might also be applicable to the request.

Other possible policy-combining algorithms can include "only applicable," which results in grant only if all applicable polices harmoniously produce a grant result, a deny only if all applicable policies harmoniously produce a deny result, and an indeterminate result otherwise. In practical terms, the indeterminate result may have the same effect as a deny result regarding the subject's access to the application's resource.

In the absence of a policy-combining algorithm being specified by an administrator, a system can follow a default policy-combining algorithm. In some embodiments, the default policy-combining algorithm specifies a "deny override" behavior, discussed above.

In some embodiments, policy sets can be defined. A policy set is a group of two or more policies. An administrator can group two or more policies into a policy set. The administrator can define a policy-combining algorithm that is applicable to the policies in the set. After all of the policies in a policy set have been evaluated, if there is any conflict in the results produced by the policies in that policy set, then the policy-combining algorithm for that policy set is evaluated to see which of those results will be the result for the whole policy set.

A policy set can include, or refer to, individual policies. The policies to which a policy set refers are deemed to be included within that policy set. A policy set also can include, or refer to, other policy sets. Thus, policy sets can be nested within other policy sets. An individual policy that is not referred to by, or included in, any policy set is called a top policy. Administrators who define policy sets can associate set-level policy combining algorithms with those policy sets. Conflicts between results of evaluations of individual policies (and/or nested policy sets) within a policy set can be resolved by apply that policy set's set-level policy combining algorithm to those results.

However, in the case in which there exist multiple policy sets that do not belong to any other policy set ("top policy sets"), and/or top policies that do not belong to any other policy set, it is possible that some such policy sets and/or top policies might produce different results. Some embodiments include techniques for resolving these situations through the specification and use of application-level policy combining algorithms.

Application-Level Policy Combining Algorithms

Figure 3:
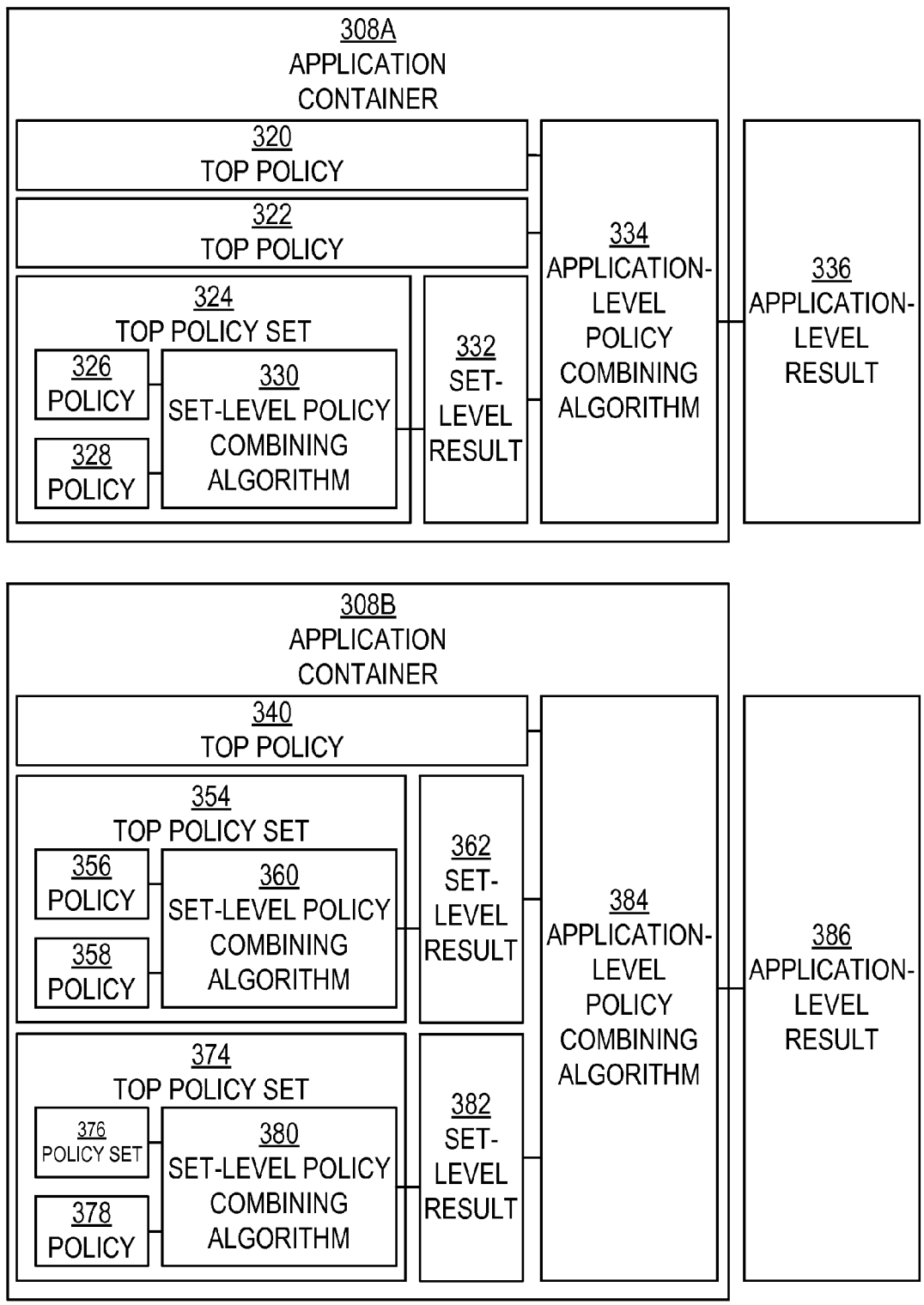
FIG. 3 is a diagram that illustrates a set of top policies and policy sets whose potentially conflicting evaluation results can be resolved through the use of an application-level policy combining algorithm, according to some embodiments.

FIG. 3 is a diagram that illustrates a set of top policies and policy sets whose potentially conflicting evaluation results can be resolved through the use of an application-level policy combining algorithm, according to some embodiments. According to some embodiments, application administrators for different applications can specify application-level policies that are specific to the applications that they administer. These application-level policies are used to resolve conflicts between results of evaluations of top policies and top policy sets relative to specific applications' resources. The application-level policy specified for one application can differ from the application-level policy specified for another application.

FIG. 3 shows application containers 308A and 308B, which can correspond to application containers 108A and 108B of FIG. 1. The policies in application container 308A therefore can be applicable to the resources of application 102A of FIG. 1 (and only that application), while the policies in application container 308B can be applicable to the resources of application 102B of FIG. 1 (and only that application).

Application container 308A includes top policies 320 and 322. Application container 308A further includes a top policy set 324. Top policy set 324 includes policies 326 and 328. Top policy set 324 is associated with a set-level policy combining algorithm 330 that is used to resolve conflicts between the results of evaluating the policies in top policy set 324. Set-level policy combining algorithm 330 produces set-level result 332.

An application-level policy combining algorithm 334 associated with the application with which application container 308A is associated resolves conflicts between set-level result 332 and the results of the evaluations of top policy 320 and top policy 322. If no application-level policy combining algorithm is specified for the policies in application container 308A, then a default application-level policy combining algorithm, such as "deny overrides," can be used. Application-level policy combining algorithm 334 produces application-level result 336.

Application container 308B includes top policy 340. Application container 308B further includes top policy sets 354 and 374.

Top policy set 354 includes policies 356 and 358. Top policy set 354 is associated with a set-level policy combining algorithm 360 that is used to resolve conflicts between the results of evaluating the policies in top policy set 354. Set-level policy combining algorithm 360 produces set-level result 362.

Top policy set 374 includes policy set 376 and policy 378. Top policy set 374 is associated with a set-level policy combining algorithm 380 that is used to resolve conflicts between the results of evaluating the policies and policy set results in top policy set 374. Set-level policy combining algorithm 380 produces set-level result 382. Set-level policy combining algorithm 380 can differ from set-level policy combining algorithm 360. Additionally, policy set 376 can be associated with its own separate set-level policy combining algorithm (not illustrated).

An application-level policy combining algorithm 384 associated with the application with which application container 308B is associated resolves conflicts between set-level results 362 and 382 and the results of the evaluations of top policy 340. If no application-level policy combining algorithm is specified for the policies in application container 308B, then a default application-level policy combining algorithm, such as "deny overrides," can be used. Application-level policy combining algorithm 384 produces application-level result 386. Application-level policy combining algorithm 384 can differ from application-level policy combining algorithm 334.

In some embodiments, the resolution of conflicts between the results produced by evaluating applicable global-level policies and applicable application-level policies is performed by the application of the application-level policy combining algorithm that is associated with the application to which the requested resources belong.

XACML Target

Figure 4:
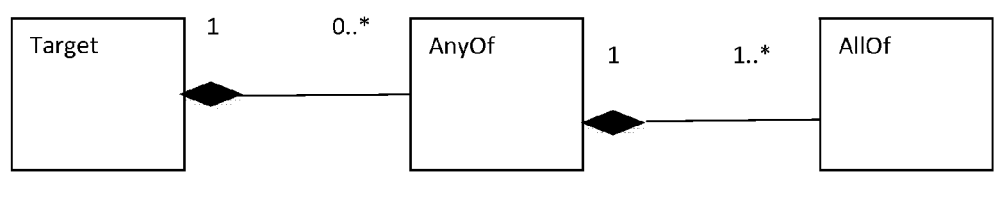
FIG. 4 is a diagram that illustrates an example of a target model, according to some embodiments.

In XACML, the target essentially defines how the subject, resource, action and environment in the policy definition are to be matched against the incoming request. A target can be defined as part of a Rule, Policy or PolicySet. Thus, when a target matches an incoming request, the rule, Policy or PolicySet is said to be an applicable entity. FIG. 4 shows an example of a target model 400, according to some embodiments.

An AllOf includes one or more conjunctive sequence of Matches of the attributes in the request context to values defined in the Match. An AnyOf includes one or more disjunctive AllOffs. Finally, a target may have a zero or more conjunctive sequences of AnyOffs.

For example, the following matching rule can be considered: Jdoe can update the Payroll Ledger. The target can be written, pseudo XML-XACML representation, as:

```
<target>
    <anyOf>
        <allOf>
            <Match access-subject-id= jdoe/>
        </allOf>
    </anyOf>
```

```
        <anyOf>
            <allOf>
                    <Match resource-id=Payroll Ledger/>
            </allOf>
        </anyOf>
        <anyOf>
            <allOf>
                <Match action-id=update />
            </allOf>
        </anyOf>
        <anyOf>
            <allOf>
                <Match environment attribute=intranet/>
            </allOf>
        </anyOf>
</target>
```

An AllOf is a conjunctive sequence of Matches. This corresponds to a Grant in a proprietary policy model. Therefore a target could be viewed as multiple anyOfs, where each anyOf spans one or more grants.

An Grant is a building blocks of the proprietary policy model, and the target definition can re-use this notion:

```
            <target>
                <anyOf>
                            <grant />
                </anyOf>
                <anyOf>
                            <grant />
                </anyOf>
                <anyOf>
                            <grant />
                </anyOf>
                <anyOf>
                        <grant />
                </anyOf>
            </target>
```

In some embodiments, a persistence representation is used in a policy store to represent a target. An example approach is discussed below.

An existing createPolicy API takes the list of Principals and Resource-actions. This API creates a policy, where each principal is granted each resource. XACML 3.0 Target definition permits arbitrary combinations while defining the target of a policy. A Target notion can be exposed in the MAPI in order to support the XACML 3.0 Target.

Policy management APIs that accept a list of Principals, List of Resources, and PermissionSets can be retained. Create APIs accept a Target. Modify apis can be modified to support the modification of the target.

The target syntax permits the following policy to be authored. As an example, a subject identified by name Jdoe having role as Administrator is an applicable target OR a role is Administrator and a subject with a role by the name MyGroup is an applicable policy. This is a valid policy from the XACML schema definition. The resources, actions and Environment constraints have been removed from this example:

```
    <target>
        <anyOf>
    <allOf>
                <Match access-subject-id= jdoe/>
    </allOf>
            <allOf>
                <Match subject-Attribute-role= MyGroup/>
```

```
            </allOf>
        </anyOf>
        <anyOf>
            <allOf>
                    <Match subject: Attribute-role = Administrator/>
            </allOf>
        </anyOf>
    </target>
```

A MAPI Target Object is defined to support authoring such policies.

The XACML standard defines a target. The policy paradigm model using a Target is different from a proprietary model offered by the management application programming interface (MAPI). Using a Target, it is possible to define a Policy such that different Subjects are granted different resource-actions and under possibly different environment constraints. A target in which all Subjects are uniformly granted all the resource-actions (under the same environment constraints) is also referred to as a 'Simple Target'.

A Policy created using Principals, Resource-Actions and an Environment Constraint can be represented as a Target. The Target definition can be obtained from the PolicyEntry. The following Target Definition can returned provided that the PRINCIPAL_SEMANTICS is OR:

```
<target>/
    <anyOf>
            <!— each principal listed below
            <allOf>subject:subject-id string-equals principal1,
            mustBePresent = true </allOf>
            <allOf> subject:subject-id string-equals principal2,
            mustBePresent = true </allOf>
            <allOf> subject:subject-id string-equals principal3,
            mustBePresent = true </allOf>
.... (repeats for each principal)
    </anyOf>
    <anyOf>
            <!—is granted each resource below
            <allOf>
                    resource:resource-id string-equals resource1,
                    mustBePresent = true
                    action:action-id string-equals action1, mustBePresent = true
            </allOf>
            <allOf>
                    resource:resource-id string-equals resource2,
                    mustBePresent = true
                    action:action-id string-equals action2, mustBePresent = true
            </allOf>
.... (repeats for each resource-Actions combo )
    </anyOf>
    <anyOf>
            <!—applying the environment constraint
            <allOf>environment matching constraint</allOf>
    </anyOf>
</target>
```

If the PRINCIPAL_SEMANTICS is AND, the following Target Definition can be returned:

```
<target>/
    <anyOf>
        <allOf>
        <!— each principal listed below
                subject:subject-id string-equals principal1,
                mustBePresent = true
        </allOf>
    </anyOf>
    <anyOf>
        <allOf>
```

```
                subject:subject-id string-equals principal2,
                    mustBePresent = true
            </allOf>
        </anyOf>
        <anyOf>
            <allOf>
                subject:subject-id string-equals principal3, mustBePresent =
                true
            </allOf>
        </anyOf>
                .... (repeats for each principal)
        <anyOf>
            <!—is granted each resource below
                <allOf>
                    resource:resource-id string-equals resource1,
                        mustBePresent = true
                    action:action-id string-equals action1, mustBePresent =
                    true
                </allOf>
                <allOf>
                    resource:resource-id string-equals resource2,
                        mustBePresent = true
                    action:action-id string-equals action2, mustBePresent =
                    true
                </allOf>
    .... (repeats for each resource-Actions combo )
        </anyOf>
        <anyOf>
            <!—applying the environment constraint
            <allOf>environment matching constraint</allOf>
        </anyOf>
</target>
```

The number of anyOfs, allOffs per principal in the target can be reduced by defining a custom Principal Attribute data type and its matching function.

If a customer wishes to take advantage of the Target definition, and alter his current Policy definition, he can author a new policy using the TargetEntry from the old Policy as a starting point and proceed to delete the old Policy and modify the Target in the new Policy as desired.

This sample code illustrates how to construct Target definition that corresponds to a Simple target. Principals jdoe and mdoe are each granted access to two resource name expressions.

```
PrincipalEntry principal =
    new BasicPrincipalEntry("wlsUserImpl", "jdoe");
ResourceNameExpression expr =
    new ResourceNameExpression("HTTPResourceType", ".*");
List<String> actions = new ArrayList<String>( );
actions.add("put");
ResourceActionsEntry rae = new BasicResourceActionsEntry(expr,
actions);
EnvironmentConstraint ec = null;
BasicCompositeMatchEntry cme = new
BasicCompositeMatchEntry(principal,
BasicCompositeMatchEntry.PRINCIPAL_SEMANTIC.OR, rae, ec);
AllOf oneAllOf = new AllOf (cme);
List<AllOf > listOfAllOfs = new ArrayList<AllOf >( );
listOfAllOfs.add(oneAllOf);
AnyOf anyOf = new AnyOf (listOfAllOfs);
List<AnyOf > listOfAnyOfs = new ArrayList<AnyOf >( );
listOfAnyOfs.add(anyOf);
BasicTargetEntry target = new BasicTargetEntry(listOfAnyOfs);
// constructing an simple target
PrincipalEntry principal1 = new BasicPrincipalEntry("wlsUserImpl",
"jdoe");
PrincipalEntry principal2 = new BasicPrincipalEntry("wlsUserImpl",
"mdoe");
List<PrincipalEntry> principals = new ArrayList<PrincipalEntry>( );
principals.add(principal1);
principals.add(principal2);
ResourceNameExpression expr1 =
    new ResourceNameExpression("HTTPResourceType", ".*");
ResourceNameExpression expr2 =
    new ResourceNameExpression("HTTPResourceType", "/myUrl/.*");
ResourceActionsEntry rae1 =
    new BasicResourceActionsEntry(expr1, actions);
ResourceActionsEntry rae2 =
    new BasicResourceActionsEntry(expr2, actions);
List<ResourceActionsEntry> resActions = new
ArrayList<ResourceActionsEntry>( );
resActions.add(rae1);
resActions.add(rae2);
// FINALLY DEFINE THE Simple TARGET
TargetEntry uniformTarget = new SimpleTargetEntry(principals,
TargetEntry.PRINCIPAL_SEMANTIC.OR, resActions, null);
```

This sample code illustrates how to construct a non-simple target:

```
PrincipalEntry principal =
    new BasicPrincipalEntry("wlsUserImpl", "jdoe");
ResourceNameExpression expr =
    new ResourceNameExpression("HTTPResourceType", ".*");
List<String> actions = new ArrayList<String>( );
actions.add("put");
ResourceActionsEntry rae = new BasicResourceActionsEntry(expr,
actions);
EnvironmentConstraint ec = null;
BasicCompositeMatchEntry cme = new
BasicCompositeMatchEntry(principal, rae, ec);
AllOf oneAllOf = new AllOf (cme);
List<AllOf > listOfAllOfs = new ArrayList<AllOf >( );
listOfAllOfs.add(oneAllOf);
principal = new BasicPrincipalEntry("wlsUserImpl", "mdoe");
expr = new ResourceNameExpression("HTTPResourceType", "/myUrl");
actions = new ArrayList<String>( );
actions.add("get");
rae = new BasicResourceActionsEntry(expr, actions);
cme = new BasicCompositeMatchEntry(principal, rae, ec);
oneAllOf = new AllOf(cme);
listOfAllOffs.add ( oneAllOf);
AnyOf anyOf = new AnyOf (listOfAllOfs);
List<AnyOf > listOfAnyOfs = new ArrayList<AnyOf >( );
listOfAnyOfs.add(anyOf);
BasicTargetEntry target = new BasicTargetEntry(listOfAnyOfs);
```

This sample code determines whether a target is simple:

```
PolicyEntry policyEntry = PolicyManager.getPolicy ( "intranetPolicy");
Target target = policyEntry.getTarget( );
if (target instanceof SimpleTarget) {
// this is a simple target
    SimpleTarget st = (SimpleTarget)target;
    // these are convenience methods to quickly get the subject | re-
source | actions| environment association.
    List<PrincipalEntry> principals = st.getPrincipals( );
    PRINCIPAL_SEMANTICS semantics = st.getPrincipalSemantics( );
    List<ResourceActionsEntry> realist = st.getResourceAc-
    tionsEntries( );
    EnvironmentConstraint ec = st.getEnvironmentConstraint( );
}
```

Figure 5:
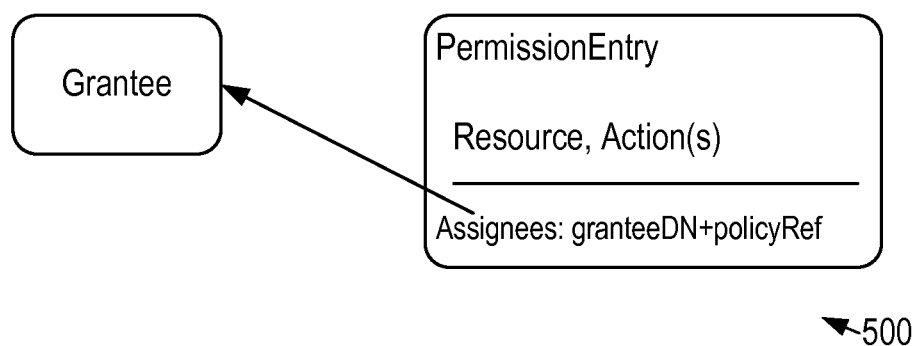
FIG. 5 is a diagram that illustrates an example of how a grant is a represented in the LDAP/DB Persistent store, according to some embodiments.

The association between the subjects, resource-actions is a grant. FIG. 5 is a diagram that illustrates an example 500 of how a grant is a represented in the LDAP/DB Persistent store, according to some embodiments. A Principal is represented as a Grantee. A Resource-Action(s) is represented as a PermissionEntry. The grantee reference is placed in the Permission in the assignee attribute. To further qualify the context in which the association is made, the policy reference is also added to the assignees. The above representation is also employed by the runtime authorization engine.

In XACML, a target can be defined in a rule too. To handle this situation, the rule reference can be encoded as part of the assignee. Further, a target can be part of a PolicySet. To accommodate this requirement, a policySet-Name can be encoded as part of the assignee. Finally, when a target is defined, an environmental construct can be part of one allOf definition. This implies a conjunctive match between the environment constraints and a resource, for example. To facilitate this requirement, an Environment constraint can be persisted along with the PermissionEntry.

Figure 6:
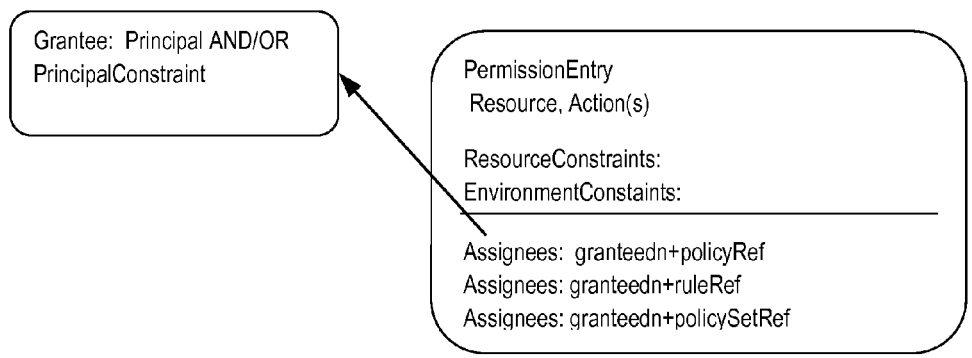
FIG. 6 is a diagram that illustrates an example of a persistence model for a Permission and Grantee, according to some embodiments.

FIG. 6 is a diagram that illustrates an example 600 of a persistence model for a Permission and Grantee, according to some embodiments. The PrincipalConstraint is persisted in the Grantee. A Grantee may have one or more PrincipalEncoding, where a PrincipalEncoding is either a Principal or a PrincipalConstraint.

The following can be considered as an example:

```
<MatchId="urn:oasis:names:tc:xacml:1.0:function:string-regexp-match">
    <AttributeValue
    DataType="http://www.w3.org/2001/XMLSchema#string">
        John.*
    </AttributeValue>
    <AttributeDesignator
        Category="urn:oasis:names:tc:xacml:1.0:subject category:access-subject"
            AttributeId=urn:oasis:names:tc:xacml:1.0:subject:subject-id"
        DataType="http://www.w3.org/2001/XMLSchema#string"/>
</Match>
```

In some embodiments, the foregoing code is encoded as one Constraint in the Grantee as:

```
{eMatchId= string-regexp-match }+[eValue= John.*]+(eAttrDesgID=subject:subject-id)+<eDType= string >+|ePresenceReq=false|
```

A multi-valued Attribute is added to the Grantee Object class.

ResourceConstraint is a multi-valued attribute, where each value of attribute is used to store the resource constraint. This target definition fragment can be considered for purposes of example:

In some embodiments, the above code is persisted with the resourceConstraint attribute value set to:

```
{eMatchId= anyURI-equal }+[eValue=
urn:example:med:schemas:record]+(eAttrDesgID=
target-namespace)+<eDType=
http://www.w3.org/2001/XMLSchema#anyURI>+|ePresenceReq= false |
    {eMatchId= xpath-node-match }+[eValue=
    md:record/md:medical]+(eAttrDesgID=
content-selector)+<eDType= data-type:xpathExpression >+|ePresenceReq=
true|
```

In some embodiments, the resourceConstraint is a multi-value persistence schema attribute in which each value will be used to store one encoded value. Similarly, the EnvironmentConstraint is a multi-valued attribute, and each value of the attribute is used to store the environmental constraint.

In some embodiments, the ActionConstraints are persisted along with the PermissionEntry as a multi-valued schema attribute.

As an example, the below target definition can be considered to be scoped to a Rule, Policy or PolicySet. Therefore, the complete representation would appear as:

```
<rule|policy|policyset>
    <target>
        <anyOf>
            <grant A/>
            <grant B />
        </anyOf>
        <anyOf>
            <grant C/>
        </anyOf>
    </target>
</rule|policy|policyset>
```

Figure 7:
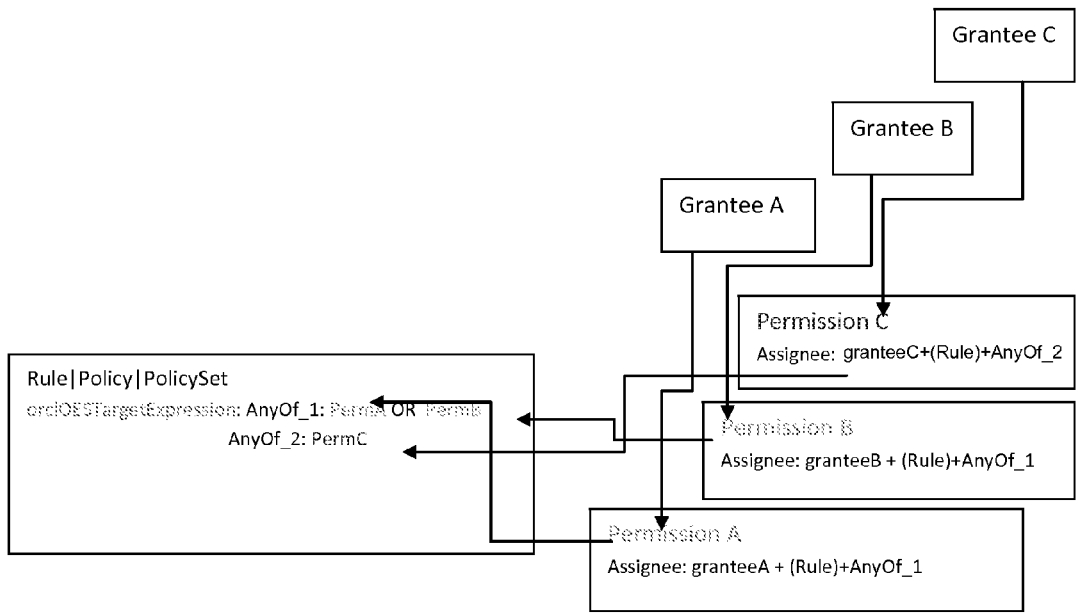
FIG. 7 is a diagram that illustrates an example of how a target can be represented in a policy store, and at runtime, according to some embodiments.

FIG. 7 is a diagram that illustrates an example 700 of how a target can be represented in a policy store, and at runtime, according to some embodiments. The target illustrated in FIG. 7 is representative of the target definition presented above.

```
<AnyOf>
    <AllOf>
        <Match
        MatchId="urn:oasis:names:tc:xacml:1.0:function:anyURI-equal">
            <AttributeValue DataType="http://www.w3.org/2001/XMLSchema#anyURI">
                urn:example:med:schemas:record
            </AttributeValue>
            <AttributeDesignator
                    MustBePresent="false"
                Category="urn:oasis:names:tc:xacml:3.0:attribute-category:resource"
                AttributeId="urn:oasis:names:tc:xacml:2.0:resource:target-namespace"
                DataType="http://www.w3.org/2001/XMLSchema#anyURI"/>
        </Match>
        <Match
            MatchId="urn:oasis:names:tc:xacml:3.0:function:xpath-node-match">
            <AttributeValue
            DataType="urn:oasis:names:tc:xacml:3.0:data-type:xpathExpression"
                    XPathCategory="urn:oasis:names:tc:xacml:3.0:attribute-category:resource">
                md:record/md:medical
            </AttributeValue>
                <AttributeDesignator
                MustBePresent="true"
                Category="urn:oasis:names:tc:xacml:3.0:attribute-category:resource"
                AttributeId="urn:oasis:names:tc:xacml:3.0:content-selector"
                DataType="urn:oasis:names:tc:xacml:3.0:data-type:xpathExpression"/>
        </Match>
    </AllOf>
</AnyOf>
```

The Grant can be persisted using Permissions and Grantees. An assignee attribute on the permission is used to establish a relation between the Permission and the Grantee, thus establishing the notion of the Grant. However, as the scope of the 'grants' is one allOf within a target, a jpsassignee can be updated to include a reference to the AnyOf this AnyOf is present in.

A multi-valued attribute on the Rule, Policy and PolicySet called TargetExpression is introduced. Each value of this attribute is used to represent one AnyOf. The Order of AnyOfs in the Target are maintained. A unique name for the AnyOf is persisted as part of this value. In the case of the LDAP and DB PolicyStore, as the grant is identified using the permission, the permission reference is stored in this value. Further, if there are two or more Grants/AllOfs in one AnyOf, addition permission references are stored in this value. In the above example, this corresponds to AnyOf_1: PermA OR PermB Additional AnyOf are represented as another value of this multi-valued attribute OrclOESTargetExpression. In the above example, this corresponds to AnyOf_2: PermC. The definition of the Persisted PolicySet, Policy and Rule object can be updated to include this multi-valued attribute.

The TargetExpression is used at runtime to quickly compute if a Target Matched. Instead of deriving this value from the persisted Permission/assignees, this value is persisted along with the Policy (rule or PolicySet) definition. The AnyOf identifier is included as part of the assignee.

In a CreatePolicy method that accepts a Target as a parameter, the following logic can be implemented; this is in addition to updating policy with the rule references:
1. Set up String[ ][ ]targetExpression;
2. Set up String[ ] anyOfOrder;
3. numAnyOf=-1;
4. Foreach AnyOf in the Target
   a. numAnyOf++;
   b. numAllOf=-1;
   c. construct unique name for anyOf as "anyof_"+numAnyOf and add to anyOfOrder.
   d. Foreach AllOf from the AnyOf
      i. numAllOf++;
      ii. Fetch the Composite Match Entry and split into Principals, Resource-Actions and Environment Attributes.
      iii. Fetch Grantee identified by Principals [AND Semantics].
      iv. Construct Permission [or re-use a Permission], where target=Resource, action=Actions, and environmentConstraint=EnvironmentAttributes.
      v. Set orcljpsassignee in Permission to using the grantee and the policy do name (rule name or policysetset)+policyDomain Name and the unique name of the anyOf.
      vi. Save Permision guid in targetExpression[numAllOf][numAnyOf]
5. Update Policy with the targetExpression and anyOfOrder.

An XML representation of the target can be aligned with the existing representation in XACML 3.0. A proprietary XML representation uses a target within a Policy. A target associates a subject, resource (resource/permission sets) currently. This definition can be enhanced to store a PrincipalConstraint in the subject section of the target and environment constraint within the target. The following changes can be made to an XML Schema. A top level element multi-target can be added—either a multi-target or a target that may appear as the root in a PolicySet, Policy or Rule:

```
<multi-target>
    <anyOf>
        <allOf>
            <target>
            </target>
        </allOf>
        <allOf>
            <target>
            </target>
        </allOf>
    </anyOf>
</multi-target>
```

Essentially, the <target> definition can be re-used as a 'grant', and the anyOf and allOf definitions can be introduced.

Platform Security Service

According to some embodiments, a platform security service provides a security framework as a part of a middleware technology stack. The various security services provided by the platform security service can include, for example: an authentication service, an authorization service, an identity store service, a credential store and credential mapper service, a farm key store service, an audit service, and a trust service.

An entitlement service is a standards-based authorization service that can provide a fine-grained authorization policy framework for applications. As used herein, a policy administration point (PAP) is a service that allows policy management. A policy decision point (PDP) is a service that performs policy evaluation during handling of policy decision requests. A policy information point (PIP) is a service that fetches policy information from external repositories. A policy enforcement point (PEP) is a service that enforces the authorization policy decisions provided by the PDP. A policy distribution service (PD) is a service that performs the policy distribution from the central policy store to the z. Controlled policy distribution is a type of policy distribution that provides policy administrators abilities such as when to PUSH the on-going policy changes through explicit policy distribution APIs. A non-controlled policy distribution is a type of policy distribution in which on-going policy changes are PULLED by PDP through explicit policy distribution APIs. An attribute based access control (ABAC) is an authorization system in which policies are defined using the attributes of policy recipient, policy resource and environment. A role based access control (RBAC) is an authorization system in which policies are defined using roles and role hierarchies where privileges are assigned to roles. Extensible Access Control Markup Language (XACML) is an authorization system where policies are defined using attributes of policy recipient, policy resource, environment and policy rules, and can return obligations. Java 2 policy is an authorization standard for J2SE and J2EE and is primarily permission based policy system. Multi-tenancy refers to a principle in software architecture where a single instance of the software runs on a server, serving multiple client organizations (tenants). A sandbox is a testing environment that isolates untested code changes and outright experimentation from the production environment or repository, in the context of software development including web development and revision control. An obligation is an operation specified in a policy or policy set that should be performed in conjunction with the enforcement of an authorization decision. A policy is a set of rules, an identifier for a rule-combining algorithm and (optionally) a set of obligations, and may be a component of a policy set. A policy-combining algorithm is a procedure for combining the decision and obligations from multiple policies. A policy set is a set of policies, other policy sets, a policy-combining algorithm and (optionally) a set of obligations, and may be a component of another policy set. An attribute is a characteristic of a subject, resource, action, or environment that may be referenced in a predicate or target.

According to some embodiments, an XACML 3.0 core profile feature is provided in an authorization service. Global shared policy artifacts can be provided across applications managed by the authorization service.

In any given enterprise, enterprise applications can share many of the IDM components like identity store, provisioning, single sign-on, etc. This provides consistent usage of the identities and identity attributes and their usage for security across the enterprise applications. A notion of shared enterprise level authorization policy information (coarse-grained or fine-grained) across the enterprise applications can be supported due to security governance and compliance requirements, a centralized policy management paradigm, the benefit of consistent and non-redundant authorization policies, and a level of administration and delegation of these shared authorization policies. As is discussed above, a global policy can be shared by multiple applications in a policy store.

In certain applications there can be many shared secured application resources (both functional and data security) across all of the applications. The methodology of shared resources and their authorization policies can be customized for these applications. This sharing of authorization policies in these applications can be accomplished differently for function security polices and data security policies in a custom fashion.

Some embodiments support a shared global policy administrative domain where applications can publish their shared policy artifacts like application roles, resource types, resources and policies. This way, a central definition of shared application policy artifacts under one shared security domain can be provided, making it easy to administer the policies with the required level of administration delegation for the owners of the artifacts for these shared artifacts and specified level of sharing of policy artifacts across the applications.

In a corporation, where there is an over-all corporate wide business policy, and each business unit has its business policy, the two policies ought to co-exist and share the same set of resources. The corporate policy can be modeled as a shared/global policy, and each business unit's policy can be an application policy. In some embodiments, certain corporate policies are made so that they cannot be over-ridden by the business unit's policies. In some embodiments, some corporate policies are made to over-ride the corporate policies due to local laws or for other reasons.

In some embodiments, policies are modeled using XACML PolicySets. Wherever a policy is to over-ridden by a business unit, a PolicySet can be defined to include a corporate-wide PolicySet. An appropriate policy combining algorithm can be combined to set the behavior.

Some embodiments support the XACML 3.0 notion of a target. A target is a collection between a subject, resource, actions and environment constraints. Some embodiments support defining a target in a rule. While evaluating a rule, the target of the rule is taken into consideration. Some embodiments support a policy including one or more rules. The rules can be evaluated as part of the policy evaluation. Some embodiments support rule combining algorithms with rule combining parameter support. Multiple rules in a policy may return different or conflicting results. A rule combining algorithm determines how the results from each rule evaluation should be combined, or returned as one effective result.

A persistence model described herein is enhanced to cater to eXtensible Access Control Markup Language (XACML) requirements for a target representation. The target definition defined in the XACML standard does not prescribe how to persist a target, but only how to represent the target. A persistence model described herein effectively and efficiently represents and persists standard XACML targets. The persistence model described herein bestows runtime benefits.

According to some embodiments, a target defined according to the XACML standard is automatically transformed to conform to a proprietary model. The representation according to the proprietary model is more susceptible to optimization than the equivalent representation under the XACML standard.

A proprietary model includes an entity called an assignee. The assignee includes attributes used to represent a grant and a rule name. By transforming a target defined in the XACML standard to a form that incorporates the assignee, existing techniques involving an assignee can be performed relative to the target.

Under the XACML standard, a target can be defined within a rule, a policy, or a policy set. When policies are evaluated at runtime, evaluation begins with the high level structures of a rule or policy and proceeds downward to the target in order to perform a match. During this process, a determination can be made as to the rule to which the target belongs. A key permission can be added to the policy structure in order to key off of a target.

XACML policy matching calls for matching a resource in the context of a target and a rule, policy, or policy set. When such matching is performed, a parent in which the target is contained can be identified. By preserving the key information within the rule, policy, or policy set, runtime performance of policy evaluation can be enhanced.

In some embodiments, an attribute called a target expression is added to a policy definition. Additionally, grantee and permission attributes of a policy are enhanced to accept XACML-formatted data. Evaluation can be based on an target attribute, value, and function. The proprietary model can be enhanced to store the target attribute, value, and function into the grantee attribute of the policy.

In some embodiments, an anyOf index is added to the policy definition. Elements of the anyOf index can point back to other attributes and values in the definition. For example, a first permission and a second permission can both share a same index value in the anyOf index. An anyOf element in an XACML target definition can include multiple allOf elements. This can result in multiple separate permission attributes in the proprietary model, indexed with the same index value in the anyOf index. In contract, an anyOf element that includes a single allOf element can cause a single permission attribute to be generated in the corresponding proprietary model, so that just one permission is indexed with a particular index value for that anyOf element.

An AttributeAssignmentExpression evaluates to a value of an Obligation or Advise Attribute. The following are contained in an AttributeAssignment: Attribute ID (or name), and the Category (type of the attribute), the issuer of the attribute, and an expression that evaluates to the value of the Attribute.

An enhance AttributeAssignment Interface class is enhanced with the following methods: Void setCategory (String categoryId) sets a categorization of the Attribute;

String getCategory( ) returns the category; void setIssuer (String issuerID); String getIssuer( ) Void AttributeAssignment (ExpressionComponent expression); ExpressionComponent getExpressionComponent( ).

If an expressionComponent is present in an AttributeAssignment, then the AttributeAssignmentExpression can be persisted in a new multi-valued attribute. AttributeId, Category, Issuer and the Expression can be encoded into one value of the attribute. As an AttributeAssignementExpression is part of an Obligation and an Advice, the object class definitions of the Obligation and Advice can be updated to include an optional AttributeAssignmentExpression.

XACML 3.0 supports a notion of ObligationExpressions in an Obligation. Essentially, an ObligationExpression is an expression which evaluates to a value of an attribute (to be returned as part of an Obligation). In some embodiments, the following changes are made to an ObligationEntry definition to accommodate the XACML 3.0 definition:

FullFillOn on value can be set in the ObligationEntry. The FullFillOn value is the effect for which this obligation is honored by the PDP. The valid values are GRANT or DENY. The FullFillOn value is treated as optional in the INFO object, and in the persistent schema too.

A list of AttributeAssignmentExpressions can optionally be set in an ObligationEntry. An AttributeAssignmentExpression is an expression that evaluates to attributes in an Obligation.

In some embodiments, the following changes are made to an ObligationEntry Interface: Void setFullFillOn (EffectType effect) throws PolicyStoreException; Effect getFullFillOn( ) can return null if an effect was not set. If Effect is not set, then the obligation is applicable to a deny or permit result.

In some embodiments, an LDAP schema definition for an Obligation can be updated to include two new optional case-sensitive, multi-valued attributes: ObligationDenyAttrAssignExpr and ObligationAllowAttrAssignExpr. The name of a 'persisted' obligation name can be made unique by utilizing the calling context's name too. The logical name of the Obligation can be saved as-is in the persisted Obligation. The Obligation schema definition is updated to have the logical name.

Advice is a construct in XACML 3.0. It is meant to be an optional piece of information provided to the PEP by the PDP. MAPI can be updated to support Advices, alongside with support in the persistent store. An Advice can be included as part of a Rule, Policy or PolicySet definition as a Set of AdviceExpression.

An AdviceEntry Interface is an information object that can consists of the following: AdviceID (name) and Set of AttributeAssignmentExpressions. An AdviceEntry info interface object can be defined as follows: AdviceEntry (String adviceNameID, ExpressionComponent expression); ExpressionComponent getExpressionComponent( ); Void setFullFillOn(EffectType effect) throws PolicyStoreException; Effect getFullFillOn( ) is non-null, and the default is DENY. Internally, an AdviceEntityManager can manage the advice.

While evaluating a decision request, it is possible an attribute referenced in the policy is not available at runtime. To provide a definite behavior to the runtime engine, XACML allows the policy author to express the required behavior if the attribute is not available. In some embodiments, a 'MustBePresent' is defined on the AttributeSelector.

An interface AttributeEntry<T extends DataType> can be enhanced to include the following methods: setPresenceRequired(boolean presence); Boolean isPresenceRequired( );

A presence attribute can be persisted along with the Attribute in the following places: as part of the Condition, Obligation definition, and constraints in the target (subject, environment or resource).

Hardware Overview

Figure 8:
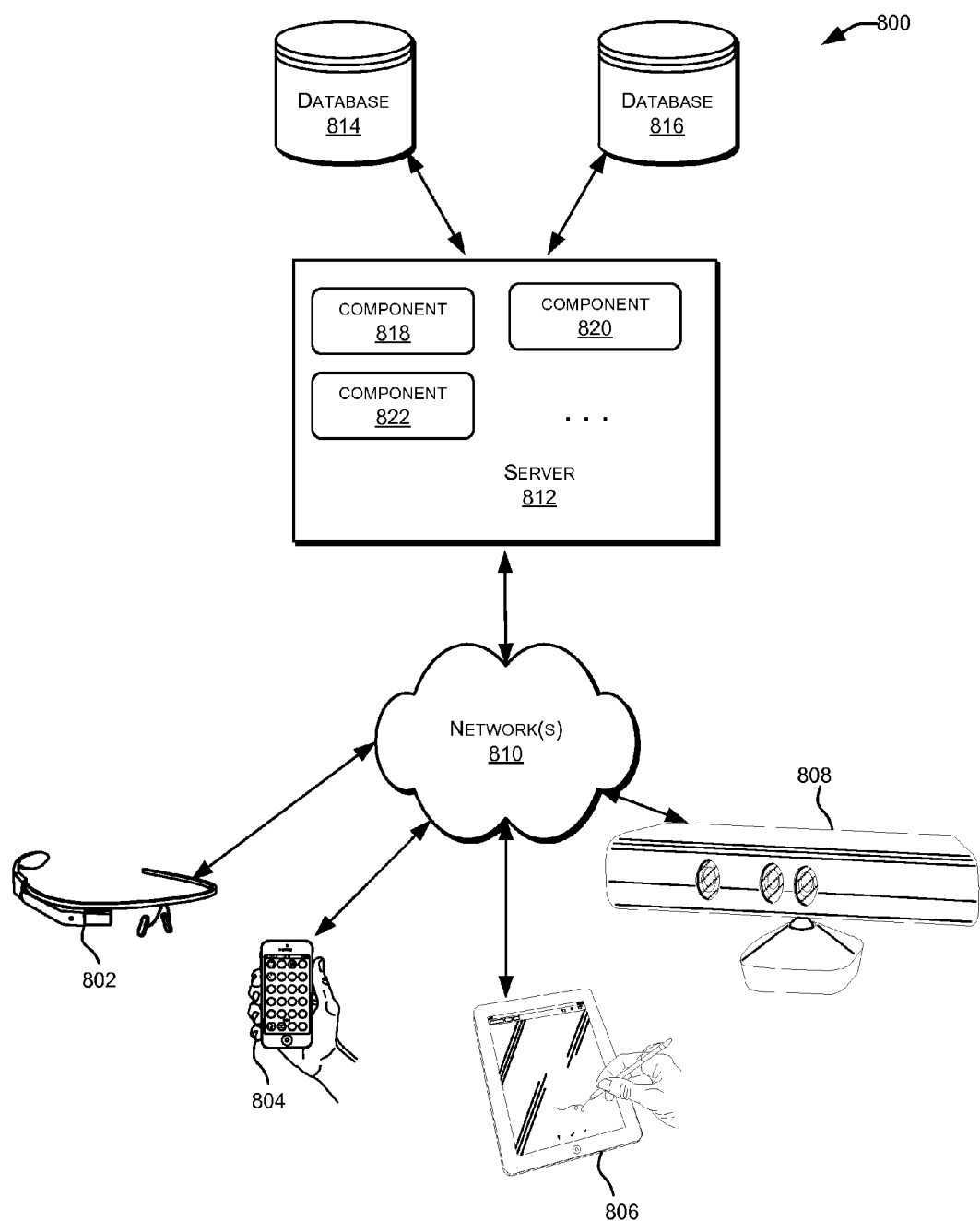
FIG. 8 depicts a simplified diagram of a distributed system for implementing some embodiments.

FIG. 8 depicts a simplified diagram of a distributed system 800 for implementing some embodiments. In the illustrated embodiment, distributed system 800 includes one or more client computing devices 802, 804, 806, and 808, which are configured to execute and operate a client application such as a web browser, proprietary client (e.g., Oracle Forms), or the like over one or more network(s) 810. Server 812 may be communicatively coupled with remote client computing devices 802, 804, 806, and 808 via network 810.

In various embodiments, server 812 may be adapted to run one or more services or software applications provided by one or more of the components of the system. In some embodiments, these services may be offered as web-based or cloud services or under a Software as a Service (SaaS) model to the users of client computing devices 802, 804, 806, and/or 808. Users operating client computing devices 802, 804, 806, and/or 808 may in turn utilize one or more client applications to interact with server 812 to utilize the services provided by these components.

In the configuration depicted in the figure, the software components 818, 820 and 822 of system 800 are shown as being implemented on server 812. In other embodiments, one or more of the components of system 800 and/or the services provided by these components may also be implemented by one or more of the client computing devices 802, 804, 806, and/or 808. Users operating the client computing devices may then utilize one or more client applications to use the services provided by these components. These components may be implemented in hardware, firmware, software, or combinations thereof. It should be appreciated that various different system configurations are possible, which may be different from distributed system 800. The embodiment shown in the figure is thus one example of a distributed system for implementing an embodiment system and is not intended to be limiting.

Client computing devices 802, 804, 806, and/or 808 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 9, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 802, 804, 806, and 808 may be any other electronic device, such as a thin-client computer, an Internet-enabled gaming system (e.g., a Microsoft Xbox gaming console with or without a Kinect® gesture input device), and/or a personal messaging device, capable of communicating over network(s) 810.

Although exemplary distributed system 800 is shown with four client computing devices, any number of client computing devices may be supported. Other devices, such as devices with sensors, etc., may interact with server 812.

Network(s) 810 in distributed system 800 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 810 can be a local area network (LAN), such as one based on Ethernet, Token-Ring and/or the like. Network(s) 810 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 812 may be adapted to run one or more services or software applications described in the foregoing disclosure. For example, server 812 may correspond to a server for performing processing described above according to an embodiment of the present disclosure.

Server 812 may run an operating system including any of those discussed above, as well as any commercially available server operating system. Server 812 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 812 may include one or more applications to analyze and consolidate data feeds and/or event updates received from users of client computing devices 802, 804, 806, and 808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 812 may also include one or more applications to display the data feeds and/or real-time events via one or more display devices of client computing devices 802, 804, 806, and 808.

Distributed system 800 may also include one or more databases 814 and 816. Databases 814 and 816 may reside in a variety of locations. By way of example, one or more of databases 814 and 816 may reside on a non-transitory storage medium local to (and/or resident in) server 812. Alternatively, databases 814 and 816 may be remote from server 812 and in communication with server 812 via a network-based or dedicated connection. In one set of embodiments, databases 814 and 816 may reside in a storage-area network (SAN). Similarly, any necessary files for performing the functions attributed to server 812 may be stored locally on server 812 and/or remotely, as appropriate. In one set of embodiments, databases 814 and 816 may include relational databases, such as databases provided by Oracle, which are adapted to store, update, and retrieve data in response to SQL-formatted commands.

Figure 9:
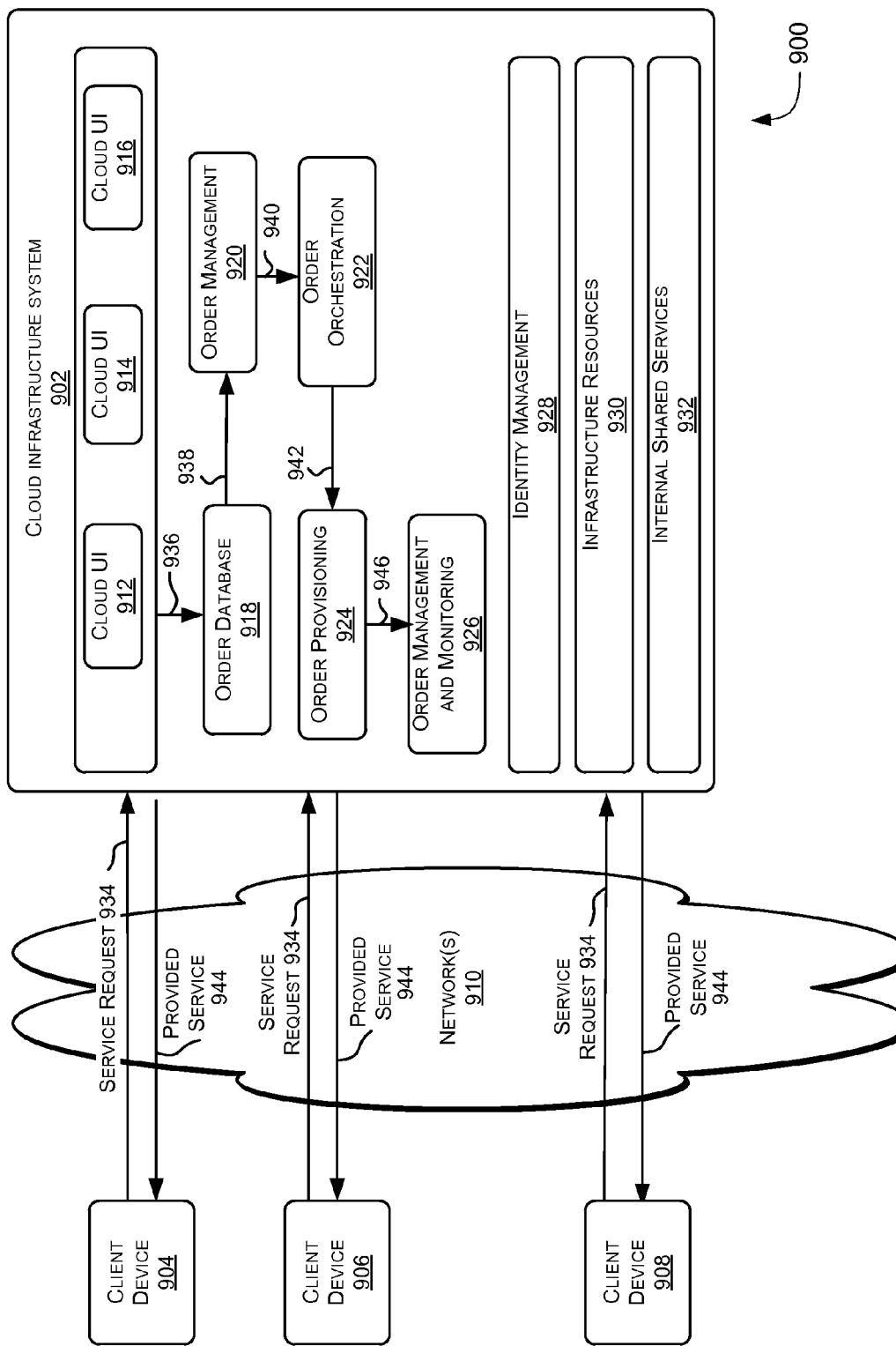
FIG. 9 is a simplified block diagram of one or more components of a system environment by which services provided by one or more components of an embodiment system may be offered as cloud services, in accordance with some embodiments.

FIG. 9 is a simplified block diagram of one or more components of a system environment 900 by which services provided by one or more components of an embodiment system may be offered as cloud services, in accordance with some embodiments. In the illustrated embodiment, system environment 900 includes one or more client computing devices 904, 906, and 908 that may be used by users to interact with a cloud infrastructure system 902 that provides cloud services. The client computing devices may be configured to operate a client application such as a web browser, a proprietary client application (e.g., Oracle Forms), or some other application, which may be used by a user of the client computing device to interact with cloud infrastructure system 902 to use services provided by cloud infrastructure system 902.

It should be appreciated that cloud infrastructure system 902 depicted in the figure may have other components than those depicted. Further, the embodiment shown in the figure is only one example of a cloud infrastructure system that may incorporate an embodiment of the invention. In some other embodiments, cloud infrastructure system 902 may have more or fewer components than shown in the figure, may combine two or more components, or may have a different configuration or arrangement of components.

Client computing devices 904, 906, and 908 may be devices similar to those described above for 802, 804, 806, and 808.

Although exemplary system environment 900 is shown with three client computing devices, any number of client computing devices may be supported. Other devices such as devices with sensors, etc. may interact with cloud infrastructure system 902.

Network(s) 910 may facilitate communications and exchange of data between clients 904, 906, and 908 and cloud infrastructure system 902. Each network may be any type of network familiar to those skilled in the art that can support data communications using any of a variety of commercially-available protocols, including those described above for network(s) 810.

Cloud infrastructure system 902 may comprise one or more computers and/or servers that may include those described above for server 812.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 902 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 902 may be adapted to automatically provision, manage and track a customer's subscription to services offered by cloud infrastructure system 902. Cloud infrastructure system 902 may provide the cloud services via different deployment models. For example, services may be provided under a public cloud model in which cloud infrastructure system 902 is owned by an organization selling cloud services (e.g., owned by Oracle) and the services are made available to the general public or different industry enterprises. As another example, services may be provided under a private cloud model in which cloud infrastructure system 902 is operated solely for a single organization and may provide services for one or more entities within the organization. The cloud services may also be provided under a community cloud model in which cloud infrastructure system 902 and the services provided by cloud infrastructure system 902 are shared by several organizations in a related community. The cloud services may also be provided under a hybrid cloud model, which is a combination of two or more different models.

In some embodiments, the services provided by cloud infrastructure system 902 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 902. Cloud infrastructure system 902 then performs processing to provide the services in the customer's subscription order.

In some embodiments, the services provided by cloud infrastructure system 902 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 902 may also include infrastructure resources 930 for providing the resources used to provide various services to customers of the cloud infrastructure system. In one embodiment, infrastructure resources 930 may include pre-integrated and optimized combinations of hardware, such as servers, storage, and networking resources to execute the services provided by the PaaS platform and the SaaS platform.

In some embodiments, resources in cloud infrastructure system 902 may be shared by multiple users and dynamically re-allocated per demand. Additionally, resources may be allocated to users in different time zones. For example, cloud infrastructure system 930 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 932 may be provided that are shared by different components or modules of cloud infrastructure system 902 and by the services provided by cloud infrastructure system 902. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 902 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 902, and the like.

In one embodiment, as depicted in the figure, cloud management functionality may be provided by one or more modules, such as an order management module 920, an order orchestration module 922, an order provisioning module 924, an order management and monitoring module 926, and an identity management module 928. These modules may include or be provided using one or more computers and/or servers, which may be general purpose computers, specialized server computers, server farms, server clusters, or any other appropriate arrangement and/or combination.

In exemplary operation 934, a customer using a client device, such as client device 904, 906 or 908, may interact with cloud infrastructure system 902 by requesting one or more services provided by cloud infrastructure system 902 and placing an order for a subscription for one or more services offered by cloud infrastructure system 902. In certain embodiments, the customer may access a cloud User Interface (UI), cloud UI 912, cloud UI 914 and/or cloud UI 916 and place a subscription order via these UIs. The order information received by cloud infrastructure system 902 in response to the customer placing an order may include information identifying the customer and one or more services offered by the cloud infrastructure system 902 that the customer intends to subscribe to.

After an order has been placed by the customer, the order information is received via the cloud UIs, 912, 914 and/or 916.

At operation 936, the order is stored in order database 918. Order database 918 can be one of several databases operated by cloud infrastructure system 918 and operated in conjunction with other system elements.

At operation 938, the order information is forwarded to an order management module 920. In some instances, order management module 920 may be configured to perform billing and accounting functions related to the order, such as verifying the order, and upon verification, booking the order.

At operation 940, information regarding the order is communicated to an order orchestration module 922. Order orchestration module 922 may utilize the order information to orchestrate the provisioning of services and resources for the order placed by the customer. In some instances, order orchestration module 922 may orchestrate the provisioning of resources to support the subscribed services using the services of order provisioning module 924.

In certain embodiments, order orchestration module 922 enables the management of business processes associated with each order and applies business logic to determine whether an order should proceed to provisioning. At operation 942, upon receiving an order for a new subscription, order orchestration module 922 sends a request to order provisioning module 924 to allocate resources and configure those resources needed to fulfill the subscription order. Order provisioning module 924 enables the allocation of resources for the services ordered by the customer. Order provisioning module 924 provides a level of abstraction between the cloud services provided by cloud infrastructure system 900 and the physical implementation layer that is used to provision the resources for providing the requested services. Order orchestration module 922 may thus be isolated from implementation details, such as whether or not services and resources are actually provisioned on the fly or pre-provisioned and only allocated/assigned upon request.

At operation 944, once the services and resources are provisioned, a notification of the provided service may be sent to customers on client devices 904, 906 and/or 908 by order provisioning module 924 of cloud infrastructure system 902.

At operation 946, the customer's subscription order may be managed and tracked by an order management and monitoring module 926. In some instances, order management and monitoring module 926 may be configured to collect usage statistics for the services in the subscription order, such as the amount of storage used, the amount data transferred, the number of users, and the amount of system up time and system down time.

In certain embodiments, cloud infrastructure system 900 may include an identity management module 928. Identity management module 928 may be configured to provide identity services, such as access management and authorization services in cloud infrastructure system 900. In some embodiments, identity management module 928 may control information about customers who wish to utilize the services provided by cloud infrastructure system 902. Such information can include information that authenticates the identities of such customers and information that describes which actions those customers are authorized to perform relative to various system resources (e.g., files, directories, applications, communication ports, memory segments, etc.) Identity management module 928 may also include the management of descriptive information about each customer and about how and by whom that descriptive information can be accessed and modified.

Figure 10:
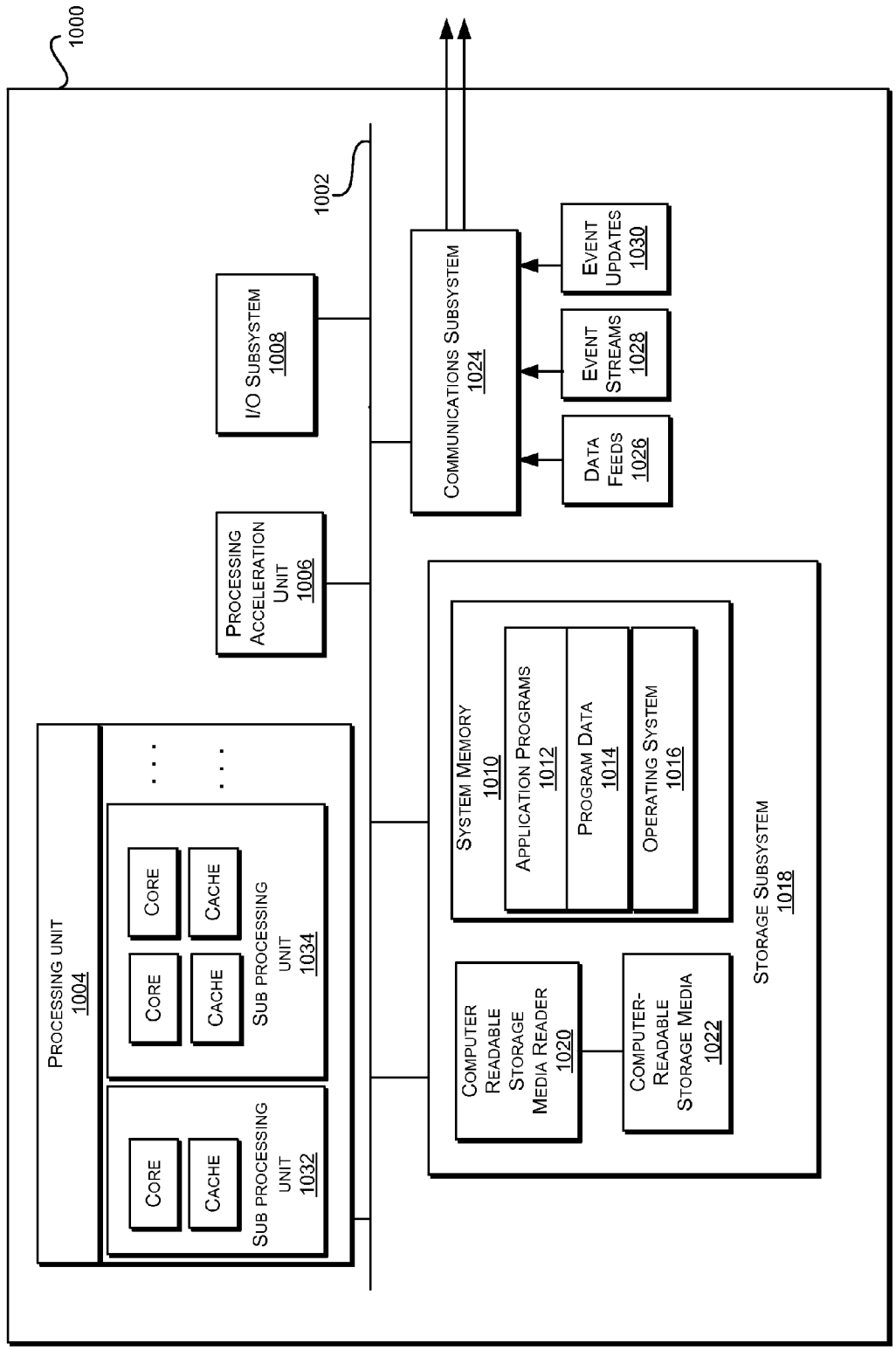
FIG. 10 illustrates an example computer system in which various embodiments may be implemented.

FIG. 10 illustrates an example computer system 1000 in which various embodiments may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present invention.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, which may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like. Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments. In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method comprising:
identifying, by a computer system of an access management system, a global policy that is stored within a global policy container and that is shared by multiple applications, wherein the identified global policy includes a global rule for determining access to a resource by a plurality of applications;
identifying, by the computer system, a first application-specific container from application-specific policy containers, the first application-specific container identified based on an association with a first application, wherein each of the application-specific policy containers stores an application-specific policy that includes an application-specification rule for determining access to a resource by an application associated with the application-specific policy container;
determining, by the computer system, by applying the global rule of the global policy and a first application-specific rule of the identified first application-specific container, whether the first application is permitted to access a requested resource;
identifying, by the computer system, a second application-specific container from the application-specific policy containers, the second application-specific container identified based on an association with a second application; and determining, by the computer system, by applying the global rule of the global policy and a second application-specific rule of a second application-specific policy in the identified second application-specific container, whether the second application is permitted to access the requested resource.

2. The computer-implemented method of claim 1, further comprising:

in response to determining that either the global rule or the first application-specific rule does not permit the first application to access the requested resource, denying the first application access to the requested resource.

3. The computer-implemented method of claim 1, further comprising:

in response to determining that either the global rule or the second application-specific rule not permit the second application to access the requested resource, denying the second application access to the requested resource.

4. The computer-implemented method of claim 1, further comprising:

in response to determining that both the global rule and the first application-specific rule permit the first application to access the requested resource, permitting the first application to access the requested resource.

5. The computer-implemented method of claim 1, further comprising:

in response to determining that both the global rule and the second application-specific rule permit the second application to access the requested resource, permitting the second application to access the requested resource.

6. An apparatus comprising:

means for identifying a global policy, the global policy being stored within a global policy container and being shared by multiple applications, wherein the identified global policy includes a global rule for determining access to a resource by a plurality of applications;

means for identifying a first application-specific container from application-specific policy containers, the first application-specific container identified based on an association with a first application, wherein each of the application-specific policy containers stores an application-specific policy that includes an application-specification rule for determining access to a resource by an application associated with the application-specific policy container;

means for determining, by applying the global rule of the global policy and a first application-specific rule of the identified first application-specific container, whether the first application is permitted to access a requested resource;

means for identifying a second application-specific container from the application-specific policy containers, the second application-specific container identified based on an association with a second application; and means for determining, by applying the global rule of the global policy and a second application-specific rule of a second application-specific policy in the identified second application-specific container, whether the second application is permitted to access the requested resource.

7. The apparatus of claim 6, further comprising:

means for denying the first application access to the requested resource in response to determining that either the global rule or the first application-specific rule does not permit the first application to access the requested resource.

8. The apparatus of claim 6, further comprising:

means for denying the second application access to the requested resource in response to determining that either the global rule or the second application-specific rule does not permit the second application to access the requested resource.

9. The apparatus of claim 6, further comprising:

means for permitting the first application to access the requested resource in response to determining that both the global rule and the first application-specific rule permit the first application to access the requested resource.

10. The apparatus of claim 6, further comprising:

means for permitting the second application to access the requested resource in response to determining that both the global rule and the second application-specific rule permit the second application to access the requested resource.

11. The apparatus of claim 6, further comprising:.

means for storing the global policy in a global container that is accessible to administrators of both the first and second applications;

means for storing a first application-specific policy in a first application-specific container that is accessible to an administrator of the first application but not to an administrator of the second application; and means for storing a second application-specific policy in a second application-specific container that is accessible to an administrator of the second application but not to an administrator of the first application.

12. A computer-implemented method comprising:

determining, by a computer system of an access management system, a mapping between a first policy-combining rule and a first application of the computer system;

determining, by the computer system, a mapping between a second policy-combining rule to a second application of the computer system;

upon applying, by the computer system, a first rule of a first policy and a second rule of a second policy to authorize access to a resource by the first application, applying, by the computer system, the first policy-combing rule to reconcile results of applying the first rule and the second rule; and upon applying, by the computer system, a third rule of a third policy and a fourth rule of a fourth policy to authorize access to a resource of the computer system by the second application, applying, by the computer system, the second policy-combing rule to reconcile results of applying the third rule and the fourth rule;

wherein the first policy-combining rule differs from the second policy-combining rule.

13. The computer-implemented method of claim 12, wherein combined rules of the first policy and the second policy are the same as combined rules of the third policy and fourth policy.

14. The computer-implemented method of claim 13, wherein combined rules of the first policy and the second policy differ from combined rules of the third policy and fourth policy.

15. The computer-implemented method of claim 13, wherein:

the first policy and the third policy are global policies that include one or more rules to determine whether applications are to be granted or denied access to a resource;

the second policy is an application specific policy including rules to determine only whether the first application should be granted or denied access to the resource; and the fourth policy is an application specific policy including rules to determine only whether the second application should be granted or denied access to the resource.

16. The computer-implemented method of claim 15, wherein reconciling results of applying the first rule and the second rule comprises reconciling results of applying the global rule with results of applying a rule of the second policy; and wherein reconciling results of applying the first rule and the second rule comprises reconciling results of applying the global rule with results of applying a rule of the fourth policy.

17. The method of claim 1, wherein the global rule differs from the first application-specific rule.

* * * * *